May 11, 1926.
A. E. PAIGE
1,584,641
CONTAINER
Filed July 22, 1921
3 Sheets-Sheet 1
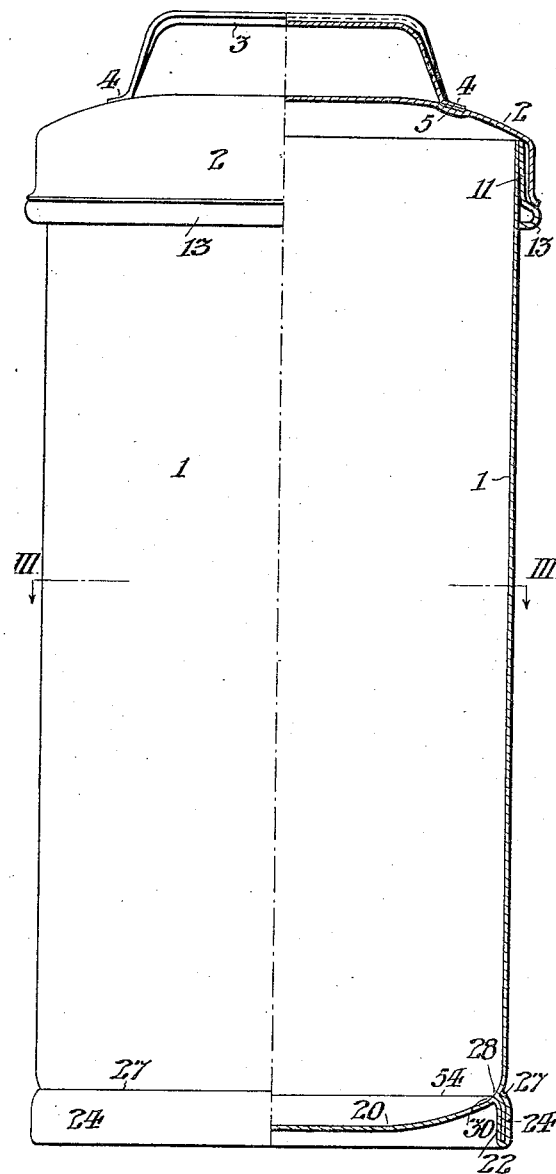
FIG. I.
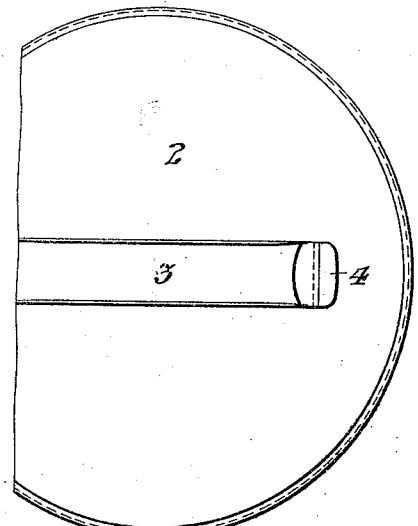
FIG. II.
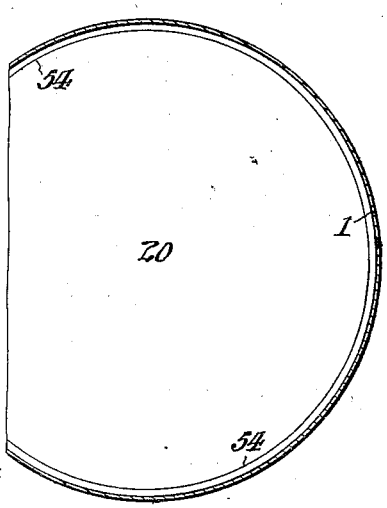
FIG. III.
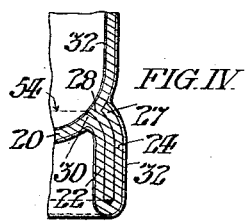
FIG. IV.
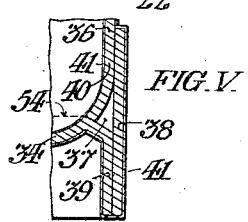
FIG. V.
INVENTOR:
Arthur E. Paige May 11, 1926.
A. E. PAIGE
1,584,641
CONTAINER
Filed July 22, 1921
3 Sheets-Sheet 2
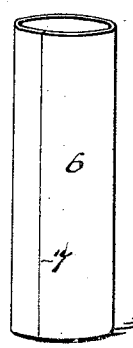
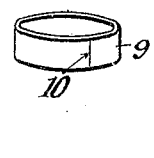
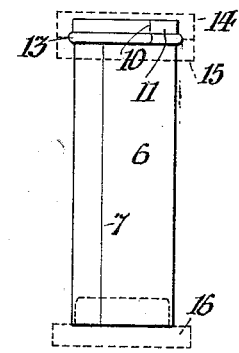
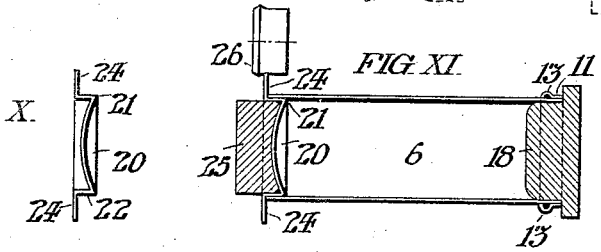
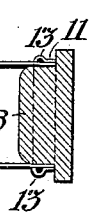
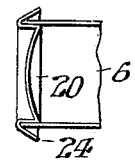
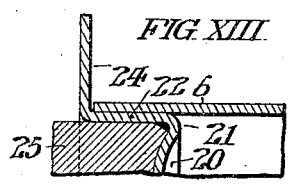
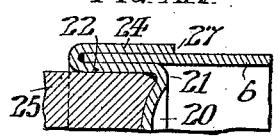
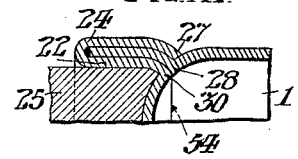
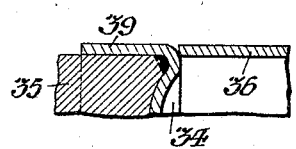
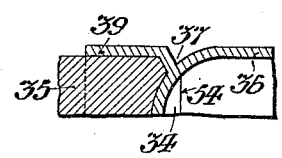
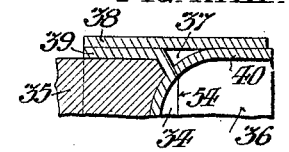
INVENTOR:
Arthur E. Paige

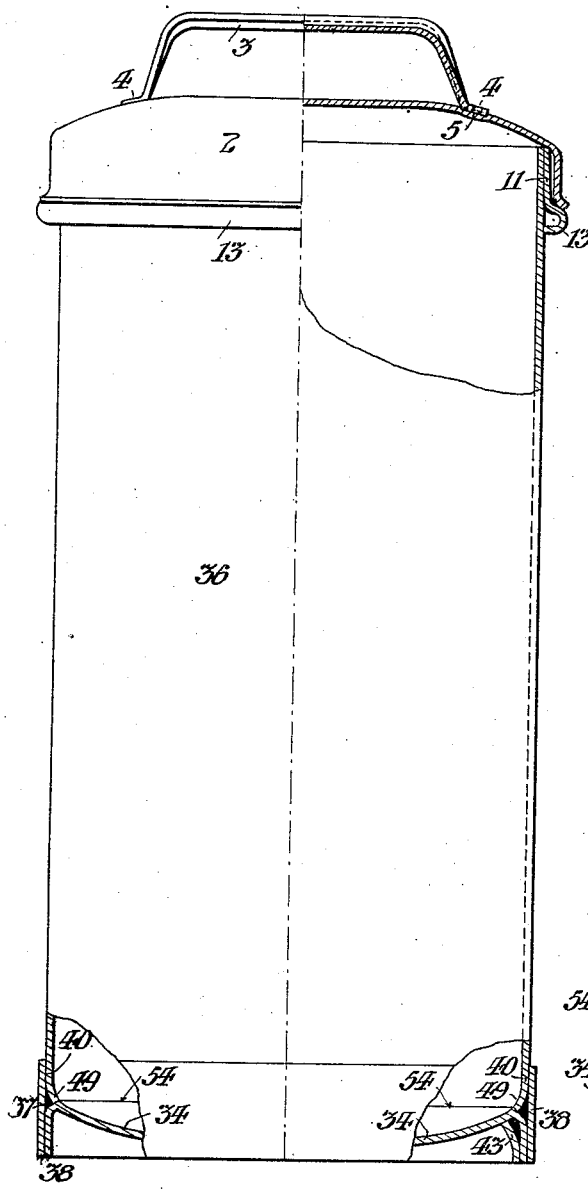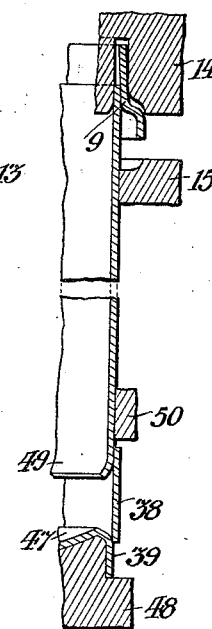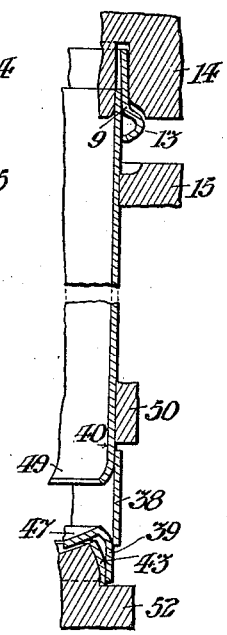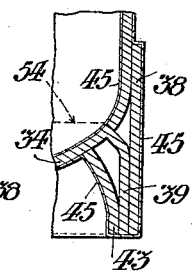

Patented May 11, 1926.

1,584,641

UNITED STATES PATENT OFFICE.

ARTHUR E. PAIGE, OF PHILADELPHIA, PENNSYLVANIA.

CONTAINER.

Application filed July 22, 1921. Serial No. 486,789.

My invention is particularly applicable to sheet metal cans used in the transportation and storage of dairy products. Such cans are used by wholesalers to deliver ice cream, frozen custards, etc., to retailers, and are used by the latter to hold such products while they are being dispensed; the emptied cans being thereafter returned to the wholesalers to be refilled and again distributed. Consequently, such cans must be extremely durable to withstand the rough handling and stresses and wear to which they are inevitably subjected. Moreover, as such containers are retained in salt ice water to preserve their contents, their bodies must be permanently liquid tight, and, to prevent contamination of their contents, they must be adapted to be substantially hermetically sealed by closures which can be instantly opened and shut, to facilitate dispensation of their contents. Furthermore, such containers should not have any internal corners or recesses or joints which cannot be readily cleaned of every vestige of their contents, by mechanical means, for such products readily and rapidly decompose.

Therefore, the object and effect of my invention is to provide cans having the characteristics above contemplated. However, it is to be understood that I do not desire to limit my invention to such specific use.

My invention includes the various novel features of construction, arrangement and procedure hereinafter specified, and particularly that the interior line of junction between the bottom and side wall of the container is spaced inwardly from said side wall; so that said junction is exposed for cleaning. However, the process for forming containers herein disclosed is claimed in my copending application Serial 536,510 filed February 14, 1922 for Letters Patent of the United States, as a division of this case.

In the drawings; Fig. I is an elevation, partly in section, of a container embodying my invention.

Fig. II is a fragmentary plan view of the structure shown in Fig. I.

Fig. III is a fragmentary transverse sectional view taken on the line III, III, in Fig. I.

Fig. IV is a fragmentary longitudinal sectional view, similar to the lower right hand corner of Fig. I, but of substantially full size, and showing the joint between the container body and the bottom plate as it exists in a finished container. The process of forming such a joint includes a spinning operation.

Fig. V is a fragmentary sectional view similar to Fig. I but showing a modified form of joint, which may be formed by a process including a spinning operation, or by a pressing operation in lieu of such spinning operation.

Fig. VI is a perspective view of a sheet metal cylinder which is the blank from which the body of the container shown in Figs. I and IV is formed.

Fig. VII is a perspective view of a cylindrical ring of sheet metal which is the blank adapted to form the flange to support and seal the lid closure on the container body.

Fig. VIII is an elevation of the ring shown in Fig. VII but partly expanded toward its final flange form.

Fig. IX is an elevation of the partly formed container body with the completed flange ring fitted upon the top thereof.

Fig. X is a diametrical sectional view of a bottom plate adapted to be fitted in the lower end of the container shown in Fig. IX.

Fig. XI is a diagrammatical axial sectional view of said container body, flange ring and bottom plate; showing said bottom plate supported upon its spinning mandrel and the opposite end of said body supported upon its expanding and supporting mandrel.

Fig. XII is a fragmentary axial sectional view of said container body and bottom plate, similar to Fig. XI, but showing the rim of the bottom plate partially spun over the bottom of the container body.

Fig. XIII is a fragmentary sectional view of substantially full size, corresponding with the upper right hand corner of Fig. XI, and showing the configuration of the inner edge of the mandrel which supports said bottom plate.

Fig. XIV is a fragmentary sectional view, of the same parts shown in Fig. XIII, but with the rim of the bottom plate spun over the bottom edge of the container body, in the cylindrical form.

Fig. XV is a fragmentary sectional view of the same parts shown in Fig. XIV, but with the free edge of the rim spun inwardly, with the container body, to make a smooth internal joint with said bottom plate.

Fig. XVI is a fragmentary radial sectional view of the same parts of the container shown in Fig. V, but showing the configuration of the inner edge of the mandrel supporting the bottom plate and showing the initial position of the container body and its bottom plate.

Fig. XVII is a fragmentary sectional view of the same parts shown in Fig. XVI, but with the bottom edge of the container body spun inwardly, with the corner of the bottom plate, to the configuration of said mandrel and forming a smoothly curved inner surface at the junction of said body and plate.

Fig. XVIII is a fragmentary sectional view of the same parts shown in Fig. XVII, with the addition of the exterior reinforcing rim, shown in Fig. V.

Fig. XIX is an elevation of half a container, partly in section, and of the modified form contemplated in Fig. V.

Fig. XX is an elevation of half a container partly in section showing a modified form of the bottom joint shown in Fig. XIX.

Fig. XXI is a fragmentary sectional view, of the parts shown at the lower right hand corner of Fig. XX but of substantially full size and showing the joint between the container body and its bottom plate as it exists in a finished container.

Fig. XXII is a fragmentary longitudinal sectional view of the parts of the container shown in Fig. XIX, but in process of assemblage and with the die elements by which they may be conveniently assembled to the form shown in Fig. XIX, without a spinning operation.

Fig. XXIII is a fragmentary longitudinal sectional view of the parts of the container shown in Fig. XXI but in process of assemblage and with die elements by which they may be conveniently assembled to the form shown in Fig. XXI, without a spinning operation.

Referring to Fig. I; the can body 1 has the removable lid closure 2 conveniently provided with the rigid handle 3; said handle having its opposite ends 4 welded in recesses 5 pressed in the top of said closure 2. Said can body 1 is formed of primarily flat sheet metal. A rectangular piece of such metal, conveniently low carbon steel, is first bent to the cylindrical blank form 6 shown in Fig. VI and then united at its abutting edges 7, conveniently by an electric welding operation, to form a blank from which the body of a can such as shown in Fig. I is formed. A cylindrical ring 9 of sheet metal, shown in Fig. VII is similarly bent and united at its abutting edges 10 to constitute a blank from which may be formed the flange ring 11 as a fixture upon said can body 1, to support said lid closure 2 as shown at the right hand side of Fig. I and thus substantially hermetically seal the joint between the bottom edge of said closure and the can, when in the position shown in said figure. Said flange ring blank 9 is expanded, by a pressing operation, from the cylindrical form shown in Fig. VII to the form shown in Fig. VIII; then pushed upon said cylindrical can blank 6 until its upper edge is flush with the top of the latter, and the expanded skirt 12 of said ring blank 9 is pressed inwardly, against said blank 6, until it is curled to form the toric bead 13 indicated in Figs. I, IX, and XI. That pressing operation may be conveniently effected by the dies 14 and 15 while the blank 6 is supported upon the mandrel 16, as indicated in Figs. IX and XXII. Such operation constricts said ring bead 13 upon said can blank 6. However, I subsequently expand said can blank 6 within said flange ring 11, slightly stretching the metal of both of said parts, to insure that they shall thereafter remain in intimate contact. Such expansion is conveniently effected by thrusting the mandrel 18 into said blank 6, as indicated in Fig. XI.

During the aforesaid operation of forming said bead 13 upon said can body 6, any irregularities in the intended circular form of the lower edge of said body 6 are corrected by said die 16 upon which said body is pressed as indicated in Fig. IX; so that said body 6 will readily fit over the bottom plate 20 as shown in Fig. XI.

Said bottom plate 20 is also formed from primarily flat sheet metal, by pressing operations which first cut a circular disk of such metal and then distort it to the cylindrical form shown in Fig. X. It is to be particularly noted that the circumferential edge 21 of the cylindrical portion 22 of said bottom plate 20, which is presented upwardly in the can against the inner face of the cylindrical wall of the latter as shown in Fig. XI, is primarily rounded as indicated in Fig. XIII so that it slips within the lower end of said body blank 6 as shown in Fig. XI, without scraping or otherwise distorting said body. Thereafter, the primarily plane annular flange 24 of said bottom plate 20 is bent over the adjacent edge of said can body blank 6, first, as indicated in full lines in Fig. XII, and, finally, to the form shown in Fig. XIV, wherein said annular flange 24 of the bottom plate 20 is cylindrical and in contact with the outer cylindrical surface of the wall of the can body blank 6; the cylindrical portion 22 of said bottom plate 20 being likewise in contact with the inner surface of said cylindrical wall of the can body. I find it convenient to thus distort said bottom plate flange 24 while spinning it upon the mandrel 25 held under pressure in opposition to said mandrel 18, while said mandrels 18 and 25 are rotated in coaxial relation as indicated in Fig. XI, by means of a roller 26.

After said container structure is spun until its parts assume the relative position shown in Fig. XIV; the spinning operation is continued until said structure assumes the shape shown in Fig. XV, wherein the free edge 27 of said bottom flange 24 is pressed inwardly, toward the axis of rotation of the can body, carrying with it a portion of the latter to form the annular internally projecting sharp edged ridge 28. Contemporaneously the primarily rounded inner corner 21 of said bottom plate 20 is deformed, inwardly, over the adjacent edge of said mandrel 25, from the configuration shown in Fig. XIV to the configuration shown in Fig. XV, so that it has an annular ridge 30 complementary to said ridge 28, forming a curved junction between the can body 1 and its bottom plate 20 as shown in Fig. XV.

It may be observed, that the last described step in the formation of the bottom joint of the can 1, shown in Figs. I and XV, not only produces the desired rounded inner surface at the junction of said can body with its bottom plate 20, but serves to materially stiffen said joint at a region where it is subjected to severe stresses, and also eliminates the sharp corner previously presented by the bottom plate flange 24 as indicated at 27 in Fig. XIV.

Finally said can body is coated, all over, with a film of some material capable of resisting the corrosive effect of water upon the ferric metal parts of the can above described. For instance, I find it convenient to coat the can with such a film 32 of block tin, as indicated in Fig. IV; so that the entire surfaces of said can 1 and its closure 2 are smoothly continuous, and, may, consequently, be readily cleaned by washing them.

Referring to Figs. V, XVI, XVII, XVIII and XIX; a container having such an internally rounded configuration as shown in Fig. I and above described may be differently formed, as follows:

In Fig. XVI; a bottom plate 34, shaped like the bottom plate 24 shown in Figs. X and XIII, except that it is slightly larger in diameter in proportion to the can body 36 and has no plane flange, is supported by the rotary mandrel 35 in opposition to said can body blank 36. Said bottom plate 34 and can body blank 36 are then spun inwardly to the configuration shown at 37 in Fig. XVII. Thereafter, the external reinforcing band 38, which is a cylindrical tube, is forced over the cylindrical portions 39 of said bottom plate 34 and the adjacent cylindrical portion 40 of said can body blank 36, to the position shown in Fig. XVIII, thus forming a joint such as is shown at the lower left hand corner of Fig. XIX, which, when finished, by a coating 41, has the form shown in Fig. V. The latter form, shown in Fig. V, has the advantage that the bottom plate 34 may be removed and replaced by another if it becomes perforated or otherwise damaged. Whereas, it is practically impossible to remove and replace the bottom plate 20 shown in Fig. IV, because said plate is clinched in the form shown, by the spinning operation to which its edge 27 has been subjected as above described. However, the form shown in Fig. IV may be considered to be advantageous in that the bottom plate is inseparably united to the container body and can not be removed even by the heating operation which is necessary to separate the parts of the structure shown in Fig. V.

The form of my invention shown in Figs. XX and XXI, differs from that shown in Figs. V and XIX in that it is also provided with a stiffening ring 43 which is pressed within the cylindrical portion 39 of the bottom plate 34 before the structure is provided with the protective coating 45 with which it is finished as shown in Fig. XXI. The latter construction is advantageous in that the joint between the container body and its bottom plate, and the bottom edge of the cotainer, are reinforced to a greater degree.

However, a container such as last above described with reference to Figs. V and XIX may be assembled without the spinning operation above described, by primarily forming the bottom plate and the lower edge of the can body of the configuration shown in Fig. XVII, instead of the configuration shown in Fig. XVI, and by simple pressing operations. In such case; the bottom plate, which is indicated at 47 in Fig. XXII, is conveniently supported by a die 48 in axial alinement with the can body 49 and the annular dies 14, 15 and 50, so that, when said dies are thrust axially the container is assembled to the form indicated in Fig. XIX wherein the lower inwardly curved edge 49 of the container body is complementary to the inner surface of the bottom plate.

As indicated in Fig. XXIII; the various elements of the container shown in Figs. XX and XXI may be assembled by a similar pressing operation, the reinforcing ring 43 being mounted upon the die 52 which is substituted for the die 48 shown in Fig. XXII.

It may be observed that, regardless of the different methods of construction above described, the containers produced thereby each have the characteristic that the dividing line 54 between the container body and its bottom plate is in spaced relation with the inner cylindrical circumference of the container body so that, even if it presented a groove, it would be accessible to any ordinary implement employed for washing and wiping such containers, so that the surface of the container at such junction may be thoroughly cleaned by such ordinary means, as distinguished from structures of the prior art wherein the junction between the bottom plate of the container and its body is at the extreme inner circumference of the latter and thus rendered inaccessible to ordinary cleaning devices because of the relative angular position of the surfaces which meet at such a junction.

Therefore, aside from the various other novel features of construction and arrangement above described; I desire to broadly claim such formation of a junction between walls of a container which extend transversely to each other, that the junction line is presented, within the container, in spaced relation with the main wall of the container, so as to be accessible as described, and, therefore, I do not desire to limit myself to the precise details of construction and arrangement herein set forth, as it is obvious that various modifications may be made therein without departing from the essential features of my invention, as defined in the appended claims.

I claim:—

1. In a container, the combination with a cylindrical tubular body having an inwardly converged curved portion adjacent the bottom thereof, said curved portion being of smoothly continuous curvature from the cylindrical surface of said body to the inner edge of said curved portion and formed by an inwardly extending annular ridge on said body, having a sharp edge of less diameter than the cylindrical portion of said body; of a bottom plate for said container having a cylindrical portion fitted in said body and a portion extending transversely to said body, said cylindrical and transversely extending portions of said bottom plate forming a sharp cornered annular ridge of less diameter than the cylindrical portion of said plate and abutting the ridge on said body and complementary thereto; the junction line between said bottom plate and body, at the interior of the latter, being in spaced relation with the inner circumference of the main wall of said body; whereby a smoothly continuous curved surface is formed upon the interior of said container at the junction of said bottom plate and body by the complementary ridges aforesaid; said bottom plate having an annular flange overlapping the exterior of said body, with its free edge inwardly turned upon said body, in opposition to said inwardly extending ridge of the latter; whereby said bottom plate is inseparably clinched in connection with said body and the bottom edge of the latter reinforced.

2. In a container, the combination with a cylindrical tubular body having an inwardly converged portion adjacent the bottom thereof, said converged portion being smoothly continuous from the cylindrical wall of said body to its inner edge; and formed by an inwardly extending annular ridge on said body; of a bottom plate for said container having a cylindrical portion fitted in said body and a portion extending transversely to said body, said cylindrical and transversely extending portions of said bottom plate forming a sharp cornered annular ridge of less diameter than the cylindrical portion of said plate and abutting the ridge on said body and complementary thereto; the junction line between said bottom plate and body, at the interior of the latter, being in spaced relation with the inner circumference of the main wall of said body; whereby a smoothly continuous surface is formed upon the interior of said container at the junction of said bottom plate and body by the complementary ridges aforesaid; said bottom plate having an annular flange overlapping the exterior of said body, with its free edge inwardly turned upon said body, in opposition to said inwardly extending ridge of the latter; whereby said bottom plate is inseparably clinched in connection with said body and the bottom edge of the latter reinforced.

3. In a container, the combination with a cylindrical tubular body having an inwardly converged curved portion adjacent the bottom thereof, said converged portion being smoothly continuous from the cylindrical wall of said body and formed by an inwardly extending annular portion of said body, having a sharp edge of less diameter than the cylindrical portion of said body; of a bottom plate for said container having a cylindrical portion fitted in said body and a curved portion extending transversely to said body, said cylindrical and transversely extending portions of said bottom plate forming a sharp cornered annular ridge of less diameter than the cylindrical portion of said plate and abutting said inwardly extending portion of said body and complementary thereto; the junction line between said bottom plate and body, at the interior of the latter, being of less diameter than and in spaced relation with the inner circumference of the main wall of said body; whereby a smoothly continuous curved surface is formed upon the interior of said container at the junction of said bottom plate and body, by said complementary portions thereof; said bottom plate having another cylindrical portion, extending exterior to said body, in unitary relation with its cylindrical portion fitted in said body, and having its free edge turned inwardly and extending within said annular portion of the body; whereby said free edge of said bottom plate is protected and the joint between said body and bottom plate stiffened.

In testimony whereof, I have hereunto signed my name at Philadelphia, Pennsylvania, this twenty-first day of July, 1921.

ARTHUR E. PAIGE.